C. D. SEEBERGER.
CONVEYER.
APPLICATION FILED OCT. 16, 1905. RENEWED DEC. 7, 1908.
927,685.
Patented July 13, 1909.
3 SHEETS—SHEET 1.
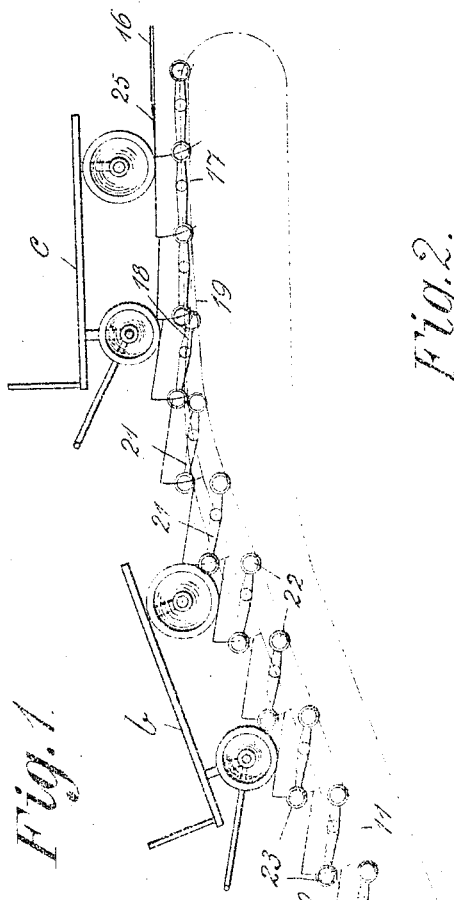
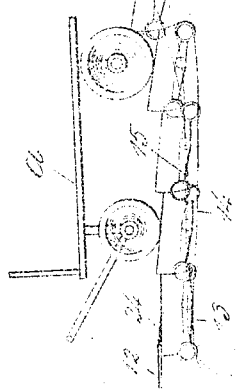
WITNESSES.
INVENTOR
ATTORNEYS C. D. SEEBERGER.
CONVEYER.
APPLICATION FILED OCT. 16, 1905. RENEWED DEC. 7, 1908.
927,685.
Patented July 13, 1909.
3 SHEETS—SHEET 2.
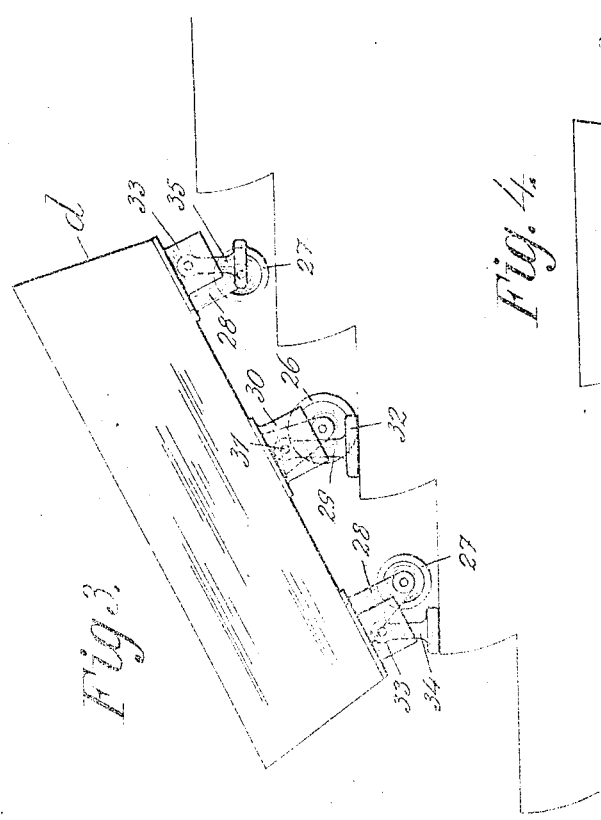
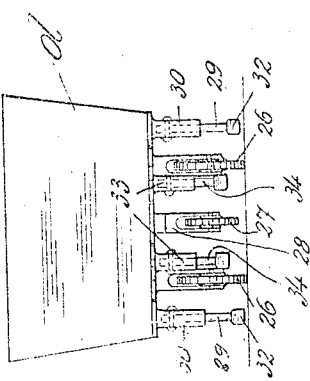
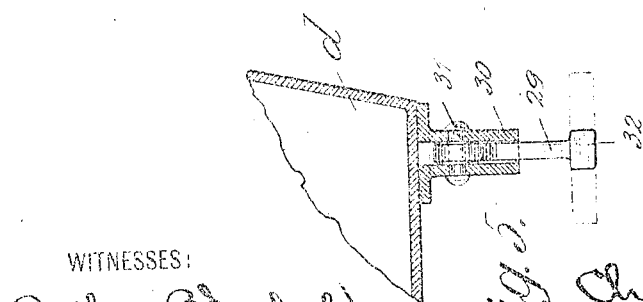
WITNESSES:
INVENTOR
Charles D. Seeberger
BY
Coburn & McRoberts
ATTORNEYS

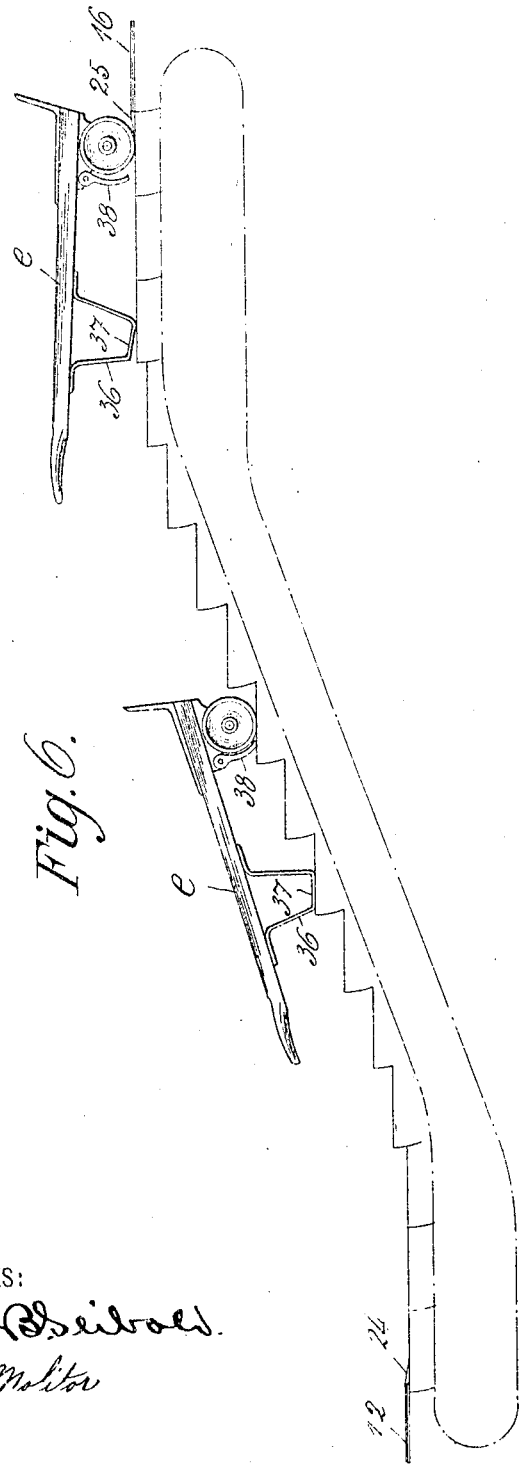

UNITED STATES PATENT OFFICE.

CHARLES D. SEEBERGER, OF YONKERS, NEW YORK.

CONVEYER.

No. 927,685.     Specification of Letters Patent.     Patented July 13, 1909.

Application filed October 16, 1905, Serial No. 282,887. Renewed December 7, 1908. Serial No. 466,408.

*To all whom it may concern:*

Be it known that I, CHARLES D. SEE-BERGER, a citizen of the United States, residing at Yonkers, in the county of Westchester and State of New York, have invented certain new and useful Improvements in Conveyers, &c., of which the following is a specification, reference being had therein to the accompanying drawing.

This invention relates to freight transporting apparatus, and has particular reference to a conveyer extending between different landings or levels and adapted to break into step-like formation on the incline, combined with a wheeled freight carrier, such as a truck, with provision, due to the action of the conveyer and resulting either from a novel arrangement of the steps or means on the trucks, for maintaining the truck in stable position on the conveyer while being transported along the incline.

The invention consists of the organizations and arrangements of parts hereinafter particularly described and then pointed out in the appended claims.

In the accompanying drawings—Figure 1 is a diagrammatic view of a moving stairway having its steps arranged to coöperate with the wheels of a truck to maintain the same on the stairway; Fig. 2 is a plan view of the upper end of the stairway shown in Fig. 1; Fig. 3 is a diagrammatic view of a portion of a moving stairway at the incline, illustrating a modification of the invention and showing a truck provided with means to block the same on the tread surfaces of the stairway; Fig. 4 is an end view of the truck seen in Fig. 3; Fig. 5 illustrates a detail of the truck; and Fig. 6 illustrates a further modification of the invention, showing a two wheel truck with blocking device.

In Fig. 1, I have shown diagrammatically a simple form of conveyer, such as a moving stairway which, while it is capable of use for transporting passengers, is of such character as to be particularly serviceable for transporting freight trucks. As there shown the track circuit on which the stairway travels comprises on the upper or transporting run the upper and lower tracks 10 and 11, respectively. These tracks under the lower level or landing 12 are in substantially the same horizontal plane, as at 13. The lower track beyond this point dips or curves slightly, as at 14, to the bottom of the incline, while the upper track 10 is slightly inclined or curved upwardly, as at 15, to the bottom of the incline, rising above the track 11. Beyond the top of the incline and adjacent the upper landing 16 the tracks are again in the same horizontal plane, as at 17, the upper track 10 at the top of the incline being carried above the plane of the horizontal tracks 17 and extending to that level by a curve, as at 18, while the lower track under the curve 18 is depressed below the horizontal 17, as at 19.

The conveyer consists of sections or steps 20 which may be of any suitable character and driven by any suitable means. The steps, in the present instance, are provided with end yokes 21 on the ends of which are mounted suitable wheels 22 and 23, the former being adapted to the lower track 11 while the latter coöperate with the upper track 10.

The lower landing 12 is provided with a suitable float 24, preferably inclined as shown in Fig. 1, which rests upon each step as it assumes a horizontal position in passing from the return run of the conveyer. This float is movable vertically so as to adjust itself to the steps, but is blocked against horizontal movement, that is from following the steps. At the upper level a similar float 25 is provided for the upper landing 16 and adapted to rest upon each step as it passes to or from the horizontal tracks 17.

By reason of the curved dip 14 in the lower track at the bottom of the incline and the gradual rise of the upper track, each step after it passes the float 24 is tilted upwardly at its riser end so that its tread surface is oblique, and as the steps pass to and up the incline this obliqueness is increased, gradually diminishing as the tracks merge into the horizontal at 17, the arrangement being such that the tread surfaces of the steps are in horizontal and in intersecting oblique planes at the landings, and in parallel oblique planes on the transporting run.

With the arrangement described the freight carrier, such as the four wheel trucks shown in Fig. 1, may be automatically picked up by the conveyer at the lower landing, transported to the top of the incline and then automatically delivered on to the upper landing.

In Fig. 1 a truck, designated *a*, is shown as entering the lower landing portion of the conveyer, while *b* and *c* indicate the truck while ascending and at the upper landing, respectively. Assuming that the conveyer is used for ascending, the wheels at one end of the truck are pushed from the floor or landing over the float 24 on to the step then passing from under the float. The tipping of the step from the horizontal, due to the arrangement of the tracks, causes the truck, as a, to be drawn forward upon the stairway until the wheels first entering on the step come to rest against the nosing or riser of the step in advance, and as the conveyer continues its movement the other wheels of the truck enter on a succeeding step passing from under the float, the truck then being entirely supported by the stairway. On the incline the truck, as b, is blocked and held against downward motion due to its weight, by reason of the obliquity of the tread surfaces. At the top landing after the advanced treads have assumed a horizontal position, the tread of the step at the head of the incline or immediately in advance thereof and on which the rear wheels of the truck, as c, rest being at an angle, owing to the rise of the upper track at 18 and the depression of the track 11 at 19, the rear wheels of the truck roll down such tread thereby pushing the forward wheels over the float 25 on to the upper floor or landing.

The obliquity of the tread surfaces on the incline to be effective for the purpose intended, that is to say to maintain the truck in a stable position, need not be of such degree as to affect the footing for passengers, so that the moving stairway may be employed for transporting not only the freight trucks, but also passengers. It is obvious that the stairway may also be driven in the reverse direction or so as to transport the trucks from an upper to a lower level, the inclination or obliquity of the steps on the incline acting in the same manner as when ascending to hold the trucks stable.

While in Fig. 1, the trucks are blocked or prevented from moving independently of the stairway by the novel arrangement of the steps, the same result may be accomplished by providing the truck with means for blocking the wheels or throwing them out of action automatically by the action of the conveyer or stairway. Such modification of the invention is illustrated in Figs. 3 to 6, inclusive.

The freight carrier or truck shown in Figs. 3, 4 and 5, may be employed with a moving stairway having its tread surfaces horizontal on the incline, as indicated in outline in Fig. 3. The carrier or truck d shown is provided intermediate its ends with suitable supporting wheels 26 on the same axis. At one end, and preferably at each end, so that the truck is rendered reversible, is a supporting and guiding wheel 27, which may be mounted in a swiveled hanger 28, so that when the truck is run on the ground or floor the end supporting wheel will readily turn when the course of the truck is changed. The center wheels 26 are larger than the swiveled end wheels so that the truck may be pushed along either while resting on its center wheels 26 with an attendant to maintain the equilibrium, or while resting on the center wheels and one of the end wheels.

The truck thus far described may be of the usual or any suitable construction. The present invention, so far as the truck is concerned, has reference to means for maintaining the truck in a stable position while being transported by a traveling stairway having horizontal tread surfaces. To this end I provide suitable supports, which are automatically brought into play, to block the truck, by the action of the conveyer sections as they break into step-like formation. These supports may be of any suitable character adapted to the attainment of the desired end. In the present instance two of the supports, as 29, are located outside the wheels 26, as shown in Fig. 4, and are pivoted at their ends in hangers 30 secured to the bottom of the truck. One of the hangers 30 is illustrated in detail in Fig. 5, and as there shown it consists of a casing in the sides of which is mounted a transverse pivot pin 31 on which the upper end of the support is pivoted. The supports 29 are provided with feet 32 having flat bearing or contact surfaces. When the truck is in a horizontal position the centers of the pivots 31 and the axis of the wheels 26 are in a vertical line and the length of the support is less than that from such pivot to the point of contact of the wheel 26 so that the feet 32 clear the floor or ground, as shown in Fig. 4. At the ends of the truck and on each side of the wheels 27 are located hangers 33 similar to 30 and in which are pivoted supports 34 and 35 similar to the supports 29. In the present embodiment of the invention each pair of end supports is located between the adjacent end wheel 27 and the end of the truck, and these supports 34 and 35 are also of such length as to clear the floor when the truck is run along the level with the associated end wheel 27 in contact with the floor.

In using the truck with a traveling stairway, the truck is moved so as to enter the wheel at one end beyond the float at the lower landing. As the step under the front wheel begins to rise it engages the leading wheel of the truck thus lifting the truck off its center wheels 26, the truck then being supported by both end wheels 27. Owing to the elevation of the advancing end of the truck due to the rise of the step on which the front wheel rests the supports 34 at the opposite end of the truck are brought into play and rest on the step under the rear wheel 27 so that the truck is then supported by the end wheels 27 and the supports 34. As the step back of the step supporting the front wheel 27 rises it engages the center wheels 26 and supports 29, which of course depend vertically, thereby lifting the front wheels from the step on which they previously rested, and raising the truck so that it is then supported by the rear supports 34 and center supports 29, as shown in Fig. 3. As the upper end of the stairway is reached and the steps at the upper landing travel in the same horizontal plane, the truck is brought to a substantially horizontal position again so as to be supported by its wheels, the supports then swinging to their vertical positions to clear the steps.

Owing to the construction described, the supports are automatically brought into play by the action of the stairway breaking into step-like formation on the incline and are also automatically thrown out of action as the steps travel with their tread surfaces in the same horizontal plane at the landing. The supports, having flat bearing surfaces, rest upon the tread surfaces holding the wheels out of engagement therewith thereby blocking the truck and preventing it from moving down the incline independently of the steps.

Instead of arranging the supports in pairs, which is done to prevent overturning of the truck when resting on the supports, the same end may be attained by employing a single support instead of a pair and extending the foot laterally, as shown in dotted lines in Fig. 5.

The end walls of the casings 30 and 33 are designed to be so disposed as to be engaged by and provide stops for the supports when the latter are at an angle corresponding to that of the incline of the moving stairway. Thus if the inclination of the stairway is 30 degrees the end walls of the casings are so located that the supports can swing only 30 degrees. If the truck is reversible then the opening of the casing would be such as to permit the support to swing 30 degrees either side of the vertical. By this arrangement the supports are held vertical while the stairway is traveling along the incline and react against the walls of the casings to prevent the supports tipping past the center.

In Fig. 6, I have shown a two-wheeled truck which is provided with a locking or blocking device to insure the truck being held securely on the stairway (shown diagrammatically) while passing along the incline. This truck, e, is generally in the form of an ordinary two-wheeled truck. The legs 36 of the truck, however, are provided with wide bearing or friction surfaces 37. These legs are of such length that the supporting surface of the truck is at less angle to the horizontal than is the incline of the escalator, the intent being to give an angle of repose to the truck surface while the inclination of the escalator may be much greater than such angle of repose. A suitable blocking device is employed to block the truck against movement and such device in the present instance consists of a curved dog or shoe 38 which is pivoted to the truck back of the wheels and so located as to come into action when its pivot center swings below the horizontal.

In use the truck is pushed on to the steps at the lower landing and as the conveyer breaks into steps at the bottom of the incline the truck is tilted at an angle throwing the shoe against the step on which the wheels rest and wedging it between the step and the wheel so as to effectually block the latter, the friction surface 37 of the leg resting on a following step. At the upper landing as the steps at the top of the incline come into the same horizontal plane again the shoe is lifted from engagement from the step and wheel, and as the steps continue their movement, owing to the frictional engagement between the leg 36 and the step on which it rests the wheels are pushed up the float and on to the landing.

Having described my invention what I claim as new and desire to secure by Letters Patent of the United States, is—

1. In a device of the class described, the combination with a conveyer consisting of sections adapted to break into step-like formation, of a wheeled truck, and provision for holding the truck against movement on the steps.

2. In a device of the class described, the combination with a conveyer consisting of sections adapted to break into step-like formation, of a wheeled truck adapted to be secured against movement on the conveyer by the action of the sections.

3. In a device of the class described, the combination with an inclined conveyer connecting different levels and consisting of sections adapted to break into step-like formation between the levels, of a wheeled truck, and provision thrown into action as the sections assume their step-like formation for preventing independent movement of the truck down the incline.

4. In a device of the class described, a wheeled truck and the like adapted to be transported by a conveyer consisting of sections which break up into step-like formation and having the wheels thereof blocked by such action of the conveyer.

5. In a device of the class described, the combination with a conveyer adapted to break into step-like formation, of a wheeled truck, and means for automatically throwing the wheels out of action while the truck is being carried along the incline.

6. In a device of the class described, the combination with a conveyer adapted to break into step-like formation, of a wheeled truck, and a device on the truck which is brought into play by the movement of the steps to maintain the truck stable on the conveyer.

7. In a device of the class described, the combination with an inclined conveyer adapted to break into step-like formation, of a truck provided with a device which is automatically brought into action by the breaking of the conveyer into step-like formation to prevent movement of the truck on the incline independently of the conveyer.

8. In a device of the class described, a wheeled truck and the like adapted to be transported by an endless conveyer consisting of sections adapted to break into step-like formation, and supports on the truck which are automatically brought into action as the sections break into steps.

9. In a device of the class described, a wheeled truck and the like adapted to be transported by an endless conveyer consisting of sections adapted to break into step-like formation, and having pivoted supports upon which the truck rests on the conveyer and which are automatically thrown into action as the conveyer breaks into step-like formation.

10. In a device of the class described, the combination with an inclined conveyer consisting of sections adapted to break into step-like formation on the incline, of a truck adapted to be transported by the conveyer and provided with center wheels and an end wheel, intermediate and end supports pivoted to the truck and of such length as to clear the floor when the truck rests upon its wheels and which are automatically thrown into action to support the truck on the conveyer as the latter breaks into step-like formation.

11. In a device of the class described, the combination with an inclined conveyer consisting of sections adapted to break into step-like formation on the incline, of a wheeled truck adapted to be transported by the conveyer, pivoted supports on the truck, which are automatically thrown into action to support the truck independently of the wheels as the conveyer breaks into step-like formation, and stops to engage the supports when moved to an angle corresponding to the inclination of the conveyer.

12. In combination with a moving inclined stairway, of a wheeled truck, and supports pivoted to the truck and thrown into action to support the truck independently of the wheels by the action of the steps and limited in their movement to an angle corresponding with the inclination of the conveyer.

13. In a device of the class described, a truck or vehicle for freight adapted to automatically change its supports while being transported from one plane to another to prevent movement of the truck independently of the transporting means.

14. In a device of the class described, a truck or vehicle for freight adapted to automatically change its supports when passing from a horizontal to an oblique plane to prevent movement of the truck on the latter plane.

15. A truck adapted to be transported by a moving conveyer and having supplemental supports which are thrown into or out of action as the conveyer passes from one plane to another.

16. In a device of the class described, a conveyer, and a truck having supports which are brought into action in alternation by the action of the conveyer.

17. In a device of the class described, a conveyer having horizontal landing portions and breaking into step-like formation between the landing portions, and a truck having supports which are brought into action in alternation as the conveyer passes from one landing portion to the other.

18. In a device of the class described, an inclined conveyer for transporting freight trucks and the like consisting of sections having their upper surfaces inclined on the transporting run.

19. In a device of the class described, an inclined conveyer consisting of sections which break into step-like formation on the incline, the tread surface of each step then being inclined downwardly from the nose thereof.

20. In a device of the class described, an inclined conveyer for transporting freight trucks and the like consisting of step-like sections having their tread surfaces inclined on the transporting run.

21. In a device of the class described, an inclined conveyer consisting of sections which break into step-like formation on the incline with their tread surfaces oblique.

22. In a device of the class described, an inclined conveyer connecting different landings and consisting of an endless moving stairway having the tread surfaces between the landings in oblique planes.

23. In a device of the class described, an inclined conveyer consisting of sections which break into step-like formation with their tread surfaces in oblique planes at the incline and in different oblique planes at the landing.

24. In a device of the class described, an inclined conveyer for transporting freight trucks and the like consisting of step-like sections having their tread surfaces in oblique planes on the transporting run and in different oblique planes at the landing.

25. In a device of the class described, an inclined conveyer connecting different landings and consisting of an endless moving stairway having the tread surfaces between the landings in parallel oblique planes and at the landings in different oblique planes.

26. In a device of the class described, the combination with upper and lower tracks forming an inclined way, of sections adapted to break into step-like formation on the incline and having front and rear wheels adapted to the lower and upper tracks, respectively, the tread surfaces of the sections being in parallel oblique planes on the incline.

27. In a device of the class described, a conveyer connecting upper and lower levels and consisting of sections adapted to break into step-like formation with their tread surfaces in horizontal and in intersecting oblique planes at the landings, and in parallel oblique planes on the inclined run.

28. In a device of the class described, a conveyer connecting upper and lower levels and consisting of sections adapted to break into step-like formation with their tread surfaces in horizontal, in parallel and in intersecting oblique planes.

29. In a device of the class described, an upper and a lower landing provided with a float, an endless conveyer extending between the landings and consisting of sections which are in step-like formations on the incline, the tread surface of each step as it passes under the float at the landings being substantially horizontal, and the tread surfaces of the steps between such points being in oblique planes.

In testimony whereof I affix my signature in presence of two witnesses.

CHARLES D. SEEBERGER.

Witnesses:
 H. L. GILLESPIE,
 A. B. SHEEHAN.